(12) United States Patent
Wang (10) Patent No.: US 7,826,387 B2
(45) Date of Patent: *Nov. 2, 2010

(54) METHOD AND APPARATUS FOR APPLICATION DRIVEN ADAPTIVE DUPLEXING OF DIGITAL SUBSCRIBER LOOPS

(75) Inventor: Xianbin Wang, Nepean (CA)

(73) Assignee: STMicroelectronics, Inc., Carrollton, TX (US)

( * ) Notice: Subject to any disclaimer, the term of this patent is extended or adjusted under 35 U.S.C. 154(b) by 1080 days.

This patent is subject to a terminal disclaimer.

(21) Appl. No.: 11/511,623

(22) Filed: Aug. 29, 2006

(65) Prior Publication Data

US 2007/0019681 A1 Jan. 25, 2007

Related U.S. Application Data

(63) Continuation of application No. 10/028,805, filed on Dec. 19, 2001, now Pat. No. 7,103,004.

(51) Int. Cl.
*H04L 12/26* (2006.01)
*H04J 3/16* (2006.01)

(52) U.S. Cl. .................. 370/252; 370/276; 370/286; 375/215; 375/225

(58) Field of Classification Search ............ None
See application file for complete search history.

(56) References Cited

U.S. PATENT DOCUMENTS

| | | | |
|---|---|---|---|
| 5,838,681 A | 11/1998 | Bonomi et al. | |
| 5,898,666 A | 4/1999 | Fukuda et al. | |
| 6,028,867 A | 2/2000 | Rawson et al. | |
| 6,073,179 A | 6/2000 | Liu et al. | |

(Continued)

FOREIGN PATENT DOCUMENTS

WO WO 00/52894 9/2000

(Continued)

OTHER PUBLICATIONS

American National Standard, "Spectrum Management for Loop Transmission Systems", T1.417-2001, pp. 51-52, date unknown.

(Continued)

*Primary Examiner*—Steven H Nguyen
(74) *Attorney, Agent, or Firm*—Lisa K. Jorgenson; Andre M. Szuwalski (57) ABSTRACT

To improve the performance of DSL modems, a DSL duplexing ratio for a new communication is selected according to the communications needs of an application. A required upstream and downstream bit rate for application communications is determined. From the ratio of these bit rates, a desired duplexing ratio is calculated. The operation of the modem is then adapted to choose a duplexing ratio that approximates the desired duplexing ratio for the application. To optimize modem operation, the size and position of the upstream and downstream bandwidths used for transmission are intelligently selected when the bit rate necessary for making the transmission is less than the total available bandwidth provided by the chosen duplexing ratio. By intelligently selecting a minimum number of subcarriers for Digital Multi-tone (DMT) signal transmission, a reduction in line driver power consumption is effectuated. Additionally, by intelligently selecting the position of the used bandwidth within the total available bandwidth, near-end crosstalk (NEXT) noise may be minimized.

28 Claims, 6 Drawing Sheets

U.S. PATENT DOCUMENTS

| | | |
|---|---|---|
| 6,088,385 A | 7/2000 | Liu |
| 6,249,543 B1 * | 6/2001 | Chow .......................... 375/219 |
| 6,351,487 B1 | 2/2002 | Lu et al. |
| 6,408,033 B1 * | 6/2002 | Chow et al. ................. 375/260 |
| 6,754,186 B1 | 6/2004 | Bullman |
| 6,778,517 B1 | 8/2004 | Lou et al. |
| 6,801,964 B1 | 10/2004 | Mahdavi |
| 6,845,125 B2 | 1/2005 | Sasaki et al. |
| 6,853,647 B1 | 2/2005 | Rawson et al. |
| 2001/0055332 A1 | 12/2001 | Sadjadpour et al. |
| 2002/0032004 A1 | 3/2002 | Widrow |
| 2002/0041656 A1 | 4/2002 | Shimura et al. |
| 2002/0168016 A1 | 11/2002 | Wang et al. |
| 2002/0176368 A1 * | 11/2002 | Reddy .......................... 370/252 |
| 2003/0043894 A1 | 3/2003 | Sestok et al. |
| 2003/0108095 A1 | 6/2003 | Duvaut et al. |
| 2003/0112858 A1 | 6/2003 | Wang |

FOREIGN PATENT DOCUMENTS

| | | |
|---|---|---|
| WO | WO-01/20864 | 3/2001 |
| WO | WO 01/61956 | 8/2001 |

OTHER PUBLICATIONS

International Telecommunication Union. Transmission Systems and Media, Proposed Draft ITU-T Recommendation G992.1 for "Asymmetrical Digital Subscriber Line (ADSL) Transceivers", pp. 56, 140, and 150, date unknown.

International Telecommunication Union, Transmission Systems and Media, ITU-T Draft Recommendation G.992.2 for "Splintterless Asymmetric Digial Subscriber Line (ADSL) Transceivers", Feb. 17, 1999.

European Search Report, EP 02 25 8601, dated Aug. 21, 2006.

* cited by examiner

METHOD AND APPARATUS FOR APPLICATION DRIVEN ADAPTIVE DUPLEXING OF DIGITAL SUBSCRIBER LOOPS

CROSS-REFERENCE TO RELATED APPLICATION

The present application is a continuation of United States Application for patent Ser. No. 10/028,805, filed Dec. 19, 2001, now U.S. Pat. No. 7,103,004, issued Sep. 5, 2006, the disclosures of which are hereby incorporated by reference.

The present application is related to commonly-assigned, co-pending, application for patent Ser. No. 10/029,190 entitled "NEAR-END CROSSTALK NOISE MINIMIZATION AND POWER REDUCTION FOR DIGITAL SUBSCRIBER LOOPS" filed Dec. 19, 2001, the disclosure of which is hereby incorporated by reference.

BACKGROUND OF THE INVENTION

1. Technical Field of the Invention

The present invention relates to digital subscriber loop (DSL) systems and, more particularly, to a method and apparatus for adapting the duplexing ratio implemented by a DSL system to meet application needs.

2. Description of Related Art

With the advent of inexpensive computers, the demand for residential broadband services has been increasing due to the widespread use of computers and the rapid development of computer networks. As a result, various Digital Subscriber Line (DSL) services have been proposed to make better use of the existing copper loop telecommunications infrastructure for the global information highway. DSL includes a large family of services including: asymmetrical DSL (ADSL); symmetrical DSL (SDSL); high data rate DSL (HDSL); and very high data rate DSL (VDSL), collectively and generally referred to as x-type digital subscriber line (xDSL) technologies.

The phrase "DSL duplexing ratio" refers to the ratio between upstream and downstream bandwidth used on the DSL loop to carry data communications. Currently, the duplexing ratio for a DSL modem implementing one specific xDSL technology is fixed. By this it is meant that the xDSL technology used by the DSL modem determines and specifies how the overall bandwidth of the physical loop link is to be shared between the upstream and downstream transmission directions, and this sharing relationship cannot be changed or adjusted.

For example, the bandwidth of an ADSL link is asymmetrically duplexed, with more bandwidth being allocated to the downstream transmission direction. More specifically, the fixed DSL duplexing ratio for ADSL is typically on the order of 1:8 to 1:4. The basic assumption for the implementation of ADSL technology is that the user will be mainly receiving data from Central Office (CO), and thus a greater portion of the available DSL bandwidth is allocated to the downstream.

While ADSL technology is likely to be the most attractive option for residential users, SDSL is more popular with business users and telecommuters. The reason for this is that the SDSL technology equally divides the available bandwidth between the upstream and downstream directions (duplexing ratio of 1:1). This allows users access to sufficient bi-directional bandwidth to efficiently send and receive large files.

The fixed duplexing ratios of xDSL technologies, however, cannot be adjusted to account for the type of the user application at issue and the bit rates needed by the DSL upstream and downstream signals. It is well recognized by those skilled in the art that different DSL duplexing ratios may be desired by the same user for different DSL applications. For example, when a video conference application is activated by a user through a DSL link, a symmetrical link is optimal. However, an asymmetrical link is desired when an upload application is launched by the user at a later time. What should be noted is that the high data rate direction is not necessarily always the downstream direction, and the duplexing ratio between upstream and downstream bandwidth often times needs to be varied on an application-by-application basis to best suit the needs of the user.

For users of applications that have similar DSL bandwidth requirements, the xDSL technologies provide acceptable service. However, due to the fixed duplexing ratios of xDSL technologies, users of applications that have variable bandwidth range needs may find themselves inefficiently utilizing the available spectrum resources for some time with an unfavorable duplexing ratio. It would be a significant benefit to the user if the DSL duplexing ratio could be adapted to the upstream and downstream communication needs of the application.

SUMMARY OF THE INVENTION

The present invention concerns a method and apparatus associated with a digital subscriber line (DSL) transceiver that improves communications performance. In response to a new initiated DSL loop communication, a required upstream and downstream bit rate for application communications is determined by a duplexing controller. From the ratio of these two bit rates, a desired duplexing ratio is calculated to meet the communications needs of the application. The operation of the duplexing controller is then adapted to choose a duplexing ratio for use over the new initiated DSL loop communication that approximates the desired duplexing ratio.

An embodiment of the invention determines a desired duplexing ratio based on a required upstream/downstream bit rate. Certain upstream and downstream subcarriers are then selected to minimize NEXT noise for the desired duplexing ratio. Additional functionality of the invention monitors performance of the duplexing ratio adapted communications system. Still further functionality abandons extra acquired bandwidth in order to improve system performance.

In accordance with an embodiment of the invention, a calculation is further made of a crosstalk noise effect caused by the new DSL loop communication with respect to other active DSL loop communications. This calculation is made for each one of a plurality of potential positions for the required upstream/downstream bandwidth within a total available upstream/downstream bandwidth specified by the chosen duplexing ratio. The potential position having the best calculated crosstalk noise effect is then selected as the position of the required upstream/downstream bandwidths for carrying the new DSL communication.

In an embodiment, a method for adapting a digital subscriber line (DSL) communications duplexing scheme to meet user application needs comprises: determining, for a new DSL loop communication, a required upstream bit rate and a required downstream bit rate for the user application; dividing the required upstream bit rate by the required downstream bit rate to obtain a desired duplexing ratio for the new DSL communication; and adapting a duplexing scheme implemented by a DSL modem in support of the new DSL loop communication to at least approximate the desired duplexing ratio. Adapting comprises: selecting a band of plural adjacent upstream subcarriers numbering less than a total available band of upstream subcarriers on a DSL loop to handle the determined required upstream bit rate; and selecting a band of plural adjacent downstream subcarriers numbering less than a total available band of downstream subcarriers on the DSL loop to handle the determined required downstream bit rate.

In another embodiment, an apparatus for adapting a digital subscriber line (DSL) communications duplexing scheme to meet user application needs comprises: means for determining, for a new DSL loop communication, a required upstream bit rate and a required downstream bit rate for the user application, the required upstream bit rate being divided by the required downstream bit rate to obtain a desired duplexing ratio for the new DSL communication; and means for adapting a duplexing scheme implemented by a DSL modem in support of the new DSL loop communication to at least approximate the desired duplexing ratio. The means for adapting operates to: select a band of plural adjacent upstream subcarriers numbering less than a total available band of upstream subcarriers on a DSL loop to handle the determined required upstream bit rate; and select a band of plural adjacent downstream subcarriers numbering less than a total available band of downstream subcarriers on the DSL loop to handle the determined required downstream bit rate.

In an embodiment, a digital subscriber line (DSL) transceiver connected to a certain loop in a cable bundle comprises: an idle cell removal machine that is operable to determine for a new DSL loop communication on the certain loop a required upstream bit rate and a required downstream bit rate for a user application, the required upstream bit rate being divided by the required downstream bit rate to obtain a desired duplexing ratio for the new DSL communication; and a duplexing controller operable to adapt a duplexing scheme implemented in support of the new DSL loop communication to at least approximate the desired duplexing ratio. This operation occurs by: selecting a band of plural adjacent upstream subcarriers numbering less than a total available band of upstream subcarriers on a DSL loop to handle the determined required upstream bit rate; and selecting a band of plural adjacent downstream subcarriers numbering less than a total available band of downstream subcarriers on the DSL loop to handle the determined required downstream bit rate.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 3:
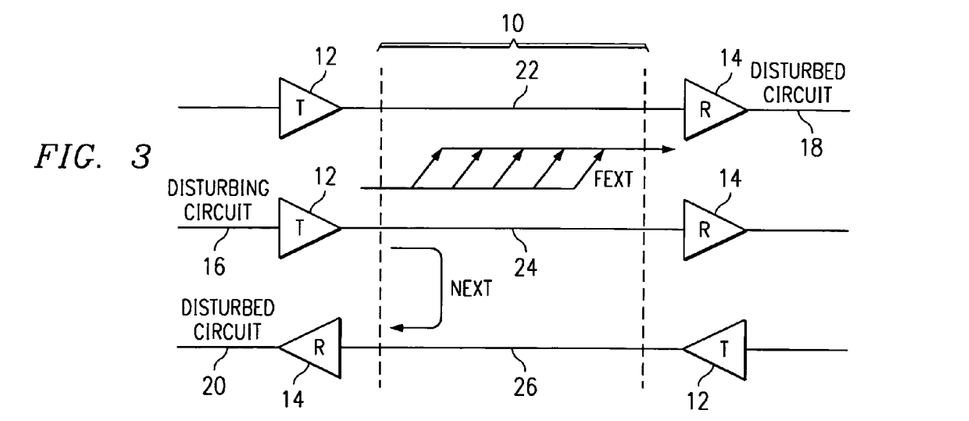
FIG. 3 is a diagram illustrating NEXT noise and FEXT noise sources in a cable bundle.

Reference is now made to FIG. 3 wherein there is shown a diagram illustrating near-end crosstalk (NEXT) noise and far-end crosstalk (FEXT) noise sources in a cable bundle 10. It is well known that the performance of a digital subscriber loop (DSL) modem is generally limited by the crosstalk noise introduced by other modems that are connected to the other loops in the same cable bundle 10. The crosstalk phenomenon can be modeled using two components, namely NEXT noise and FEXT noise. A DSL line driver 12 is designated by a triangular "T" reference, while a DSL line receiver 14 is designated by a triangular "R" reference. A disturbing circuit 16 is shown as both a NEXT noise component source and a FEXT noise component source. NEXT noise occurs when the line receiver 14 of the disturbed circuit 20 is located at the same end of the cable bundle 10 as the line driver 12. The disturbed circuit 20 experiences NEXT noise due to electromagnetic radiation received on line (or loop) 26 from line/loop 24 in the cable bundle 10. FEXT noise occurs when the line receiver 14 of the disturbed circuit 18 is located at the other end of cable bundle 10 from the line driver 12. The disturbed circuit 18 experiences FEXT noise due to electromagnetic radiation received on line/loop 22 from line/loop 24.

Generally speaking, it is NEXT noise, as opposed to FEXT noise, that presents the major source of interference. The reason for this is that FEXT noise passes through the entire DSL loop. Because its propagation loss generally is very large, in many cases the FEXT noise can be ignored. The opposite is true with respect to NEXT noise which undergoes little, relatively speaking, attenuation in its short transmission path. The concerns over NEXT noise remain even when the bit rate of the transmitted signal is small because idle ATM cells are inserted to fill up all the data frames of the DSL link (both upstream and downstream), and the transmission of this filler material is also a source of noise.

When DSL services are offered on different loops in the same cable bundle, it is very important to reduce and minimize NEXT noise contributed by a DSL communication on one loop with respect to the communications on other loops. Doing so beneficially improves DSL system error rate performance and increases loop throughput.

In order to improve the performance of a DSL modem, one primary objective of a modem designer should be the minimization of crosstalk noise in the cable bundle 10. This is especially true with respect to the NEXT noise component. For example, NEXT noise may be minimized in prior art ITU-T G.992.1 and ITU-T G.992.2 ADSL transmitter system implementations by separating the upstream and downstream bandwidths. This prior art solution, however, is of limited utility as DSL modems and communications services become more complex, and a need exists for a technique of more universal and future applicability for reducing the NEXT noise component and combating power dissipation concerns. The issue of noise minimization becomes of even greater concern as options for adapting the duplexing ratio, as discussed herein, are presented to the user.

In accordance with the present invention, an optimized crosstalk performance for a DSL system may be obtained by considering the following factors:

Minimization of the NEXT noise. The existence of overlapping upstream and/or downstream bandwidths for DSL communications by plural users on a common cable bundle is a primary cause of NEXT noise. It is further recognized that not all of the available downstream bandwidth is needed for a communication and thus a smaller, necessary or required bandwidth may be allocated. Some control may be exercised over the placement of the required downstream bandwidth within the DSL spectrum. By selectively placing the required downstream bandwidth, the NEXT effect experienced by others on the same cable bundle as a result of a common or overlapping bandwidth between loops may be minimized, and significant reductions in NEXT noise may be achieved.

Minimization of allocated bandwidth. DSL operation dictates the insertion of idle ATM cells to fill all data frames when the bit rate of the data to be transmitted is smaller than the available throughput rate of the DSL link (both upstream and downstream) that is defined by the allocated number of subcarriers. For example, when the DSL user is browsing a website, the upstream data rate can be as low as few kilobits per second, with the remainder of the available throughput rate being met by the transmission of idle ATM cells that add substantively nothing to the data transmission but nonetheless contribute significantly to crosstalk noise as well as power consumption. In some extreme situations, for example, when there is no data to be transmitted, idle ATM cells are transmitted to fill the available throughput rate and accordingly comprise the only source of crosstalk noise. By intelligently selecting the minimum number of the subcarriers used for the Digital Multi-tone (DMT) signals (i.e., minimizing the utilized bandwidth) according to the bit rates of the data streams in the upstream and downstream directions, the size of the DSL link bandwidth used for communication is better tailored to the data being transmitted and crosstalk noise to other users, especially NEXT noise, can be significantly reduced. As an added benefit, by controlling the usage of the upstream and downstream bandwidth in terms of the minimum number of allocated and utilized DMT subcarriers, the power consumption of the line driver is substantially reduced.

Figure 4:
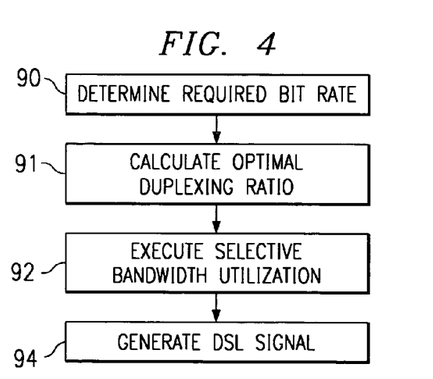
FIG. 4 is flow diagram illustrating a process for establishing a new DSL link with an adapted duplexing ratio.

Attention is now directed to FIG. 4 which is a flow diagram illustrating a process for establishing a new DSL loop communication. In step 90, the required bit rate for the data communication (upstream and/or downstream) over the new DSL loop communication is determined. More specifically, the data communication is examined to identify and remove idle ATM cells. What is left over substantially represents the bit rate requirements of the application for transmission of the data communication itself.

Figure 5:
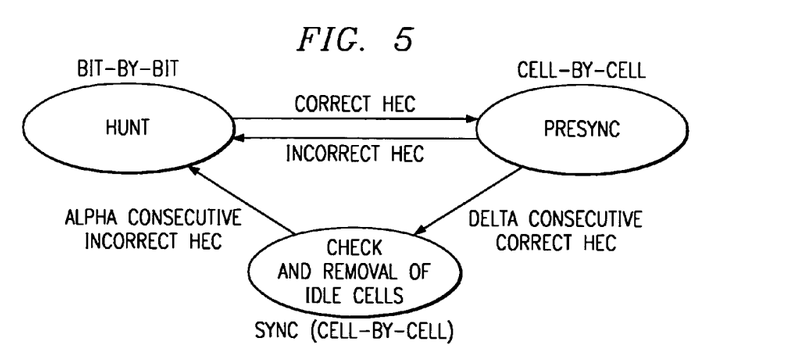
FIG. 5 is a state machine diagram operating an idle ATM cell removal process.

An idle ATM cell removal process performed in connection with step 90 permits the identification ATM cell boundaries in the payload of the data communication. The cells within the boundaries may then be discarded. Reference is now made to FIG. 5 wherein there is shown a state machine diagram operating the idle ATM cell removal process. The details of the state diagram are described below.

In the HUNT state, the ATM delineation process is performed by checking bit-by-bit for the correct header error control (HEC) field in the cell header. Once it is found, an assumption is made that one header has been found, and the method enters the PRESYNC state. It should be recognized that when byte boundaries are available, the cell delineation process may be performed on a byte-by-byte basis instead.

In the PRESYNC state, the delineation process is performed by checking cell-by-cell for the correct HEC field. The process repeats until the correct HEC field has been confirmed a DELTA number of times consecutively. As an example, ITU-T I.432 suggests that the DELTA number be 6. The process then moves to the SYNC state. If an incorrect HEC field is found, the process returns to the HUNT state.

In the SYNC state, idle cells will be discarded by checking the header of each cell. The process for performing this discarding operation is shown in the flow diagram of FIG. 6. The cell delineation will be assumed to be lost if an incorrect HEC field is obtained an ALPHA number of times consecutively. As an example, ITU-T I.432 suggests that the ALPHA number be 7. If an incorrect HEC field is found, the process returns to the HUNT state.

Figure 6:
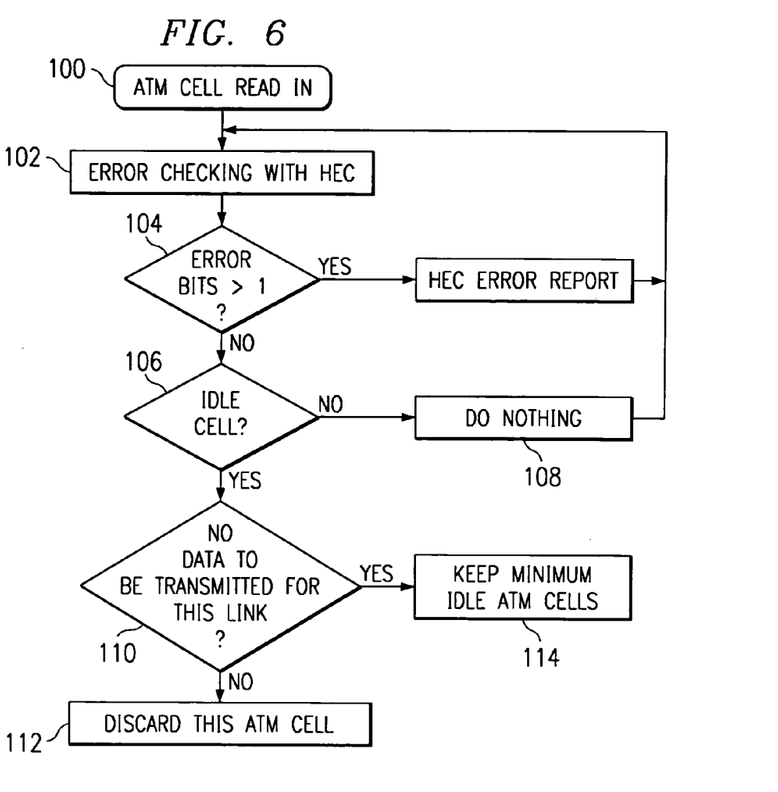
FIG. 6 is flow diagram illustrating a process for performing an idle cell discarding operation.

The idle cell discarding operation of FIG. 6 that is performed in the SYNC state first reads an ATM cell in (step 100). Next, in step 102, the read-in cell is error checked using the HEC field. If the number of error bits exceeds one, as determined in step 104, the process performed by the idle cell removal machine will report the HEC error and return to step 102. Otherwise, the process moves on to check in step 106 for an idle ATM cell by, for example, determining whether the virtual path identifier (VPI) virtual channel identifier (VCI) and payload type (PLT) information bits in the header are all zero, and also if the cell loss priority (CLP) is one. If not all of these conditions are met, nothing is to be done with the read-in cell (step 108) and the process returns to step 102. The reason for this is that the process for idle cell removal is designed to only remove the redundant idle cells in the ATM data stream. Original data must remain unchanged. If the ATM cell under examination is not an idle cell (i.e., the cell is a data cell), the cell is passed on to the next transmitter processing stage. If there is a match in step 106, the process moves to step 110 where a determination is made as to whether no data exists to be transmitted on the link. If the determination is no (i.e., that there is data to be transmitted), then the ATM cell can be discarded in step 112. Otherwise, the ATM cell is kept in step 114 as a minimum required ATM cell for the link (for example, for DSL synchronization purposes). Following steps 112 or 114, the process returns to step 100 to read in a next ATM cell.

Reference is now once again made to FIG. 4. The step 90 determined bit rates for the upstream and downstream reflect the actual communications bandwidth needs of the application using the DSL service. With knowledge of this information, a DSL duplexing ratio that is more tailored to the upstream and downstream communications needs of a given application may be selected in step 91. A desired duplexing ratio may be calculated as follows:

$$D = \frac{BitRate_{upstream}}{BitRate_{downstream}} \tag{1}$$

wherein:

$BitRate_{upstream}$ is the step 90 determined upstream bit rate for the new DSL communication; and $BitRate_{downstream}$ is the step 90 determined downstream bit rate for the new DSL communication.

Once the desired duplexing ratio D is determined, an appropriate adaptive duplexing scheme can be selected. If true adaptive control can be exercised, the selected adaptive duplexing scheme will divide the DSL bandwidth between upstream and downstream in a proportion that matches the desired duplexing ratio. Due to implementation constraints (both technological and monetary), the DSL modems will likely possess the capability of implementing only a limited number of discrete duplexing schemes with respect to dividing the DSL bandwidth between upstream and downstream. In this case, the supported discrete duplexing scheme that most closely approximates the desired duplexing ratio will be selected. As an example, DSL modems in accordance with the present invention may possess the capability to operate in any selected one of nine different discrete duplexing schemes as shown in Table 1:

TABLE 1

Exemplary Duplexing Schemes

| | scheme | | | | | | | | |
|---|---|---|---|---|---|---|---|---|---|
| | 1 | 2 | 3 | 4 | 5 | 6 | 7 | 8 | 9 |
| $N_{SU}$ | 8 | 32 | 64 | 96 | 128 | 160 | 192 | 224 | 248 |
| $N_{SD}$ | 248 | 224 | 192 | 160 | 128 | 96 | 64 | 32 | 8 | wherein:

$N_{SU}$ is the number of upstream subcarriers that are allocated by the DSL modem for the upstream portion of the communication; and $N_{SD}$ is the number of downstream subcarriers that allocated by the DSL modem for the downstream portion of the communication.

The scheme 1-9 that provides a duplexing ratio that most closely approximates the desired duplexing ratio D (from Equation (1)) is chosen and implemented as a discrete duplexing scheme in support of application DSL communications. In this way, it will be recognized that the modem implements a sub-optimal duplexing ratio (with adaptation capabilities), but this is, nonetheless, preferred over the single, fixed duplexing scheme implemented by conventional xDSL technologies.

With continued reference to FIG. 4, the step 90 determined bit rates for the upstream and downstream will generally be much smaller than the corresponding maximum available throughput rates on the DSL loop as defined by the step 91 chosen duplexing ratio. This allows for some flexibility to be exercised in selectively using different parts of the duplexing ratio specified upstream and downstream bandwidth to minimize instances of overlapping bandwidth within the same cable bundle that contributes to NEXT noise and further reduce the power consumption of the DSL modem. The operation for selective bandwidth utilization is performed in step 92.

Figure 7:
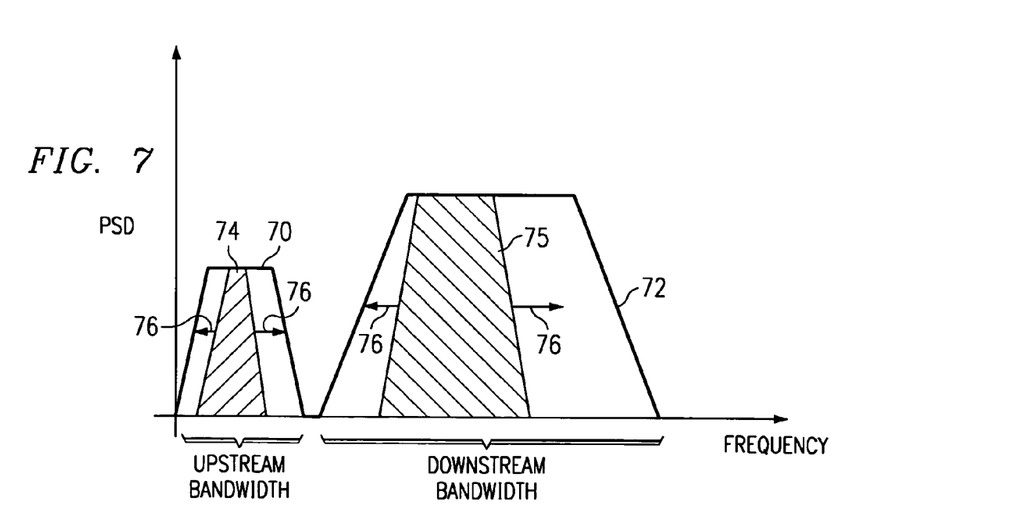
FIG. 7 illustrates selective bandwidth utilization for DSL service.

The concept of selective bandwidth utilization (step 92) is illustrated in an exemplary fashion in FIG. 7 for a CPE DSL receiver. Trapezoid 70 represents the total available upstream bandwidth in accordance with the step 91 chosen duplexing ratio. Trapezoid 72 represents the total available downstream bandwidth in accordance with the step 91 chosen duplexing ratio. Shaded trapezoid 74 represents the required downstream bandwidth needed to support transmission of the step 90 determined downstream bit rate for a DSL communication. Shaded trapezoid 75 represents the required downstream bandwidth needed to support transmission of the step 90 determined downstream bit rate for a DSL communication. It is recognized that the required upstream and downstream bandwidths, 74 and 75, respectively, are smaller than the total available upstream and downstream bandwidths, 70 and 72, respectively, that are made available through the step 91 chosen duplexing ratio. Because of this, a selective position placement of each of the required upstream and downstream bandwidths 74 and 75 within the total available upstream and downstream bandwidths 70 and 72 may be made in step 92. This selective placement is effectuated by individually sliding (as indicated by the arrows 76) the required upstream and downstream bandwidths 74 and 75 in position along the frequency axis until a suitable location is identified. The determination of what is suitable is made in accordance with the present invention by evaluating crosstalk noise at each potential required upstream and downstream bandwidth 74 and 75 location within the total available upstream and downstream bandwidths 70 and 72. The locations chosen for the positioning and placement of the required upstream and downstream bandwidths 74 and 75 within the total available upstream and downstream bandwidths 70 and 72 are those locations where crosstalk noise due to overlapping bandwidth is minimized.

Figure 8:
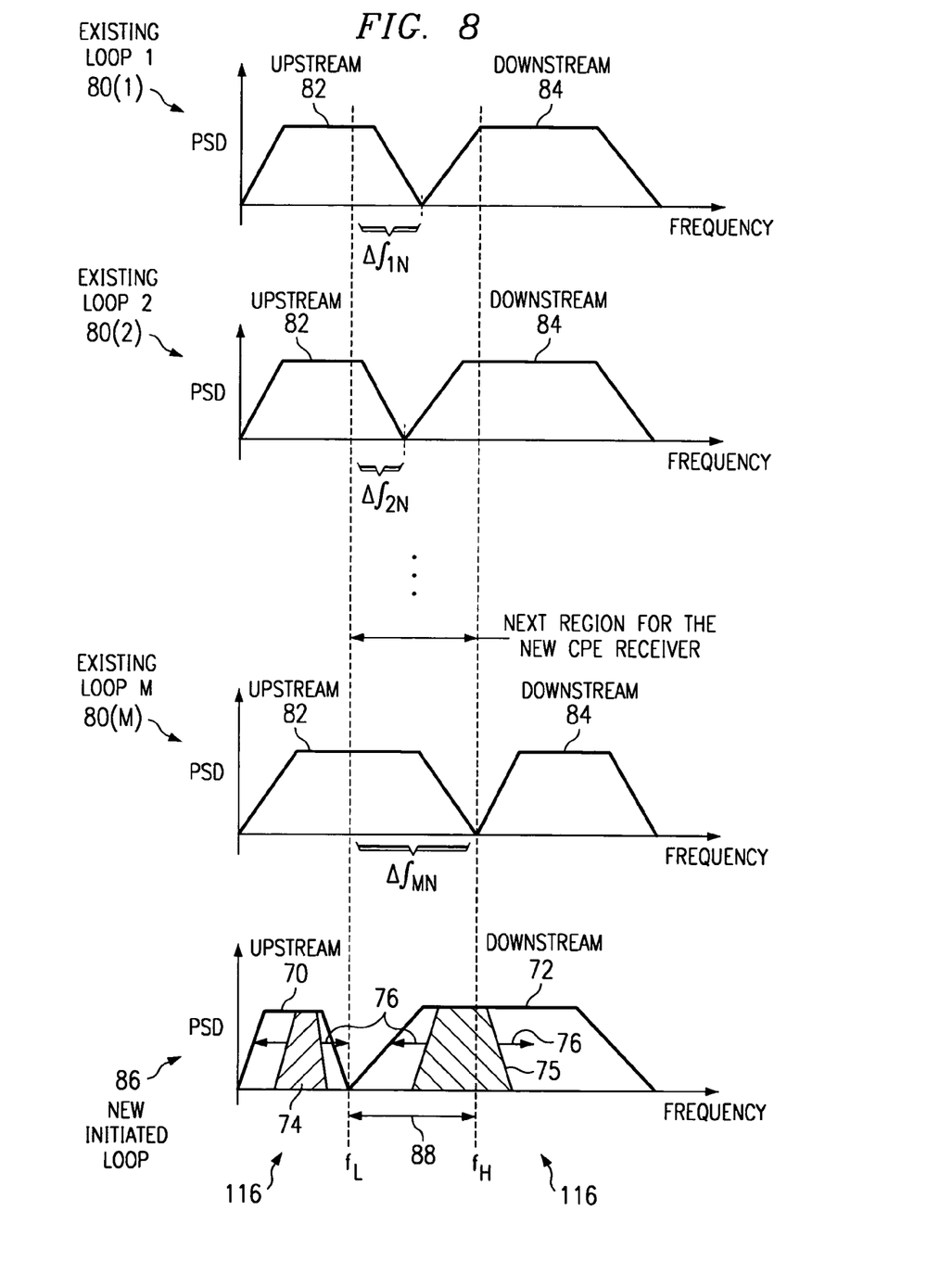
FIG. 8 illustrates selective bandwidth utilization to minimize NEXT noise in a non-overlapped DSL system implementation.
Figure 9:
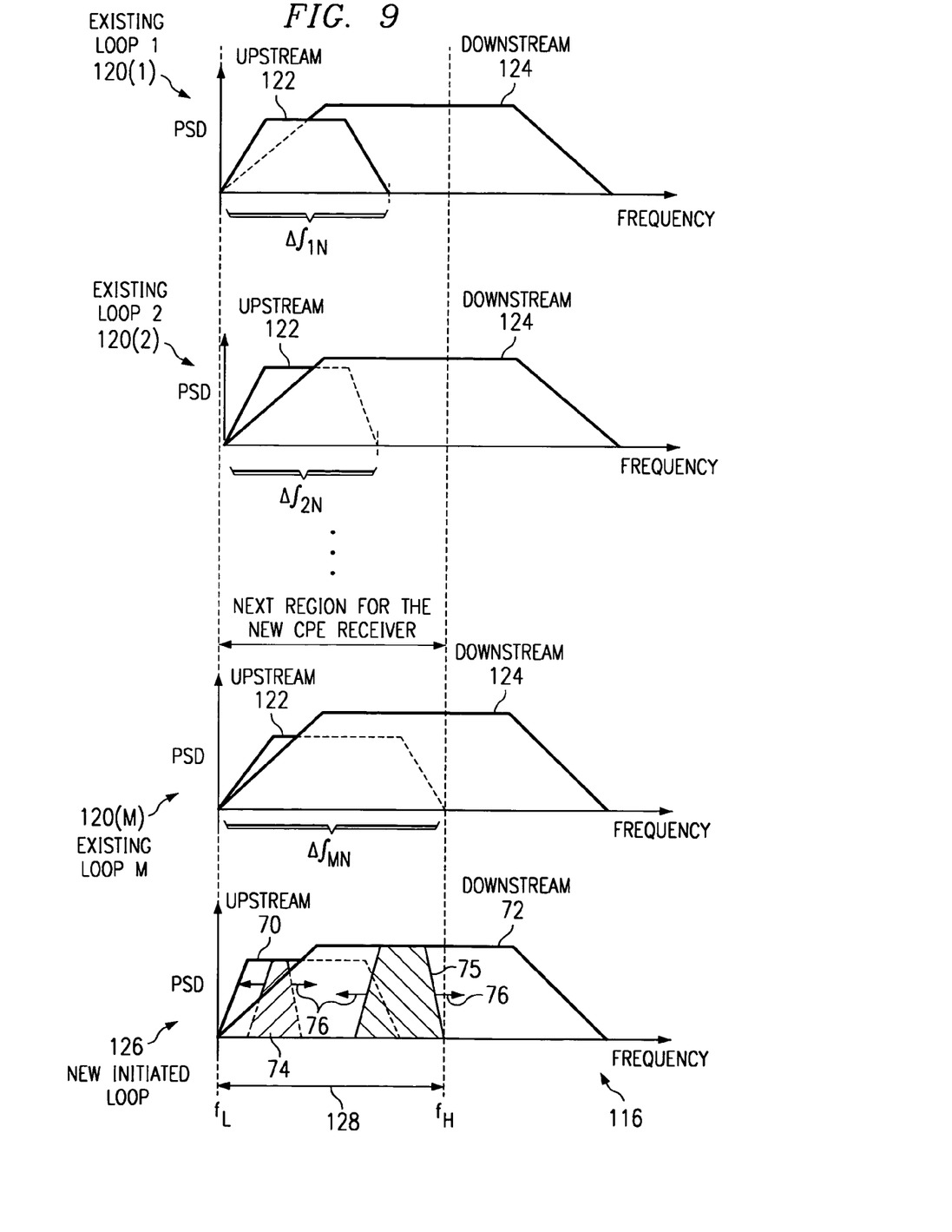
FIG. 9 illustrates selective bandwidth utilization to minimize NEXT noise in an overlapped DSL system implementation.

It is to be noted here that the meaning of "overlapping bandwidth" in the context of the present invention is the bandwidth that is responsible for the existence of crosstalk noise, primarily, NEXT noise, in a cable bundle. This is graphically illustrated in FIGS. 8 and 9 for two different modes of DSL operation. In FIG. 8, selective bandwidth utilization to minimize NEXT noise is illustrated in a non-overlapped DSL system implementation. A non-overlapped DSL system is one where the upstream and downstream bandwidths are separated from each other in the frequency band. In FIG. 9, selective bandwidth utilization to minimize NEXT noise is illustrated in an overlapped DSL system implementation. An overlapped DSL system is one where the upstream and downstream bandwidths are not separated from each other (i.e., they wholly or partially overlap) in the frequency band.

Turning first to FIG. 8, it is noted that on a given cable bundle, M non-overlapped loop communications 80(1)-80(M) already exist. These communications 80 are established and are each using a designated upstream bandwidth 82 and a designated downstream bandwidth 84 on their respective individual loops. Notably, these bandwidths may, and likely will be, of different sizes and positions within the frequency band (especially if the other modems possess adaptive duplexing ratio and/or selective bandwidth utilization capabilities). At this point, a new loop communication 86 is to be initiated. This loop communication 86, as discussed above in connection with FIG. 7, has a step 91 chosen adaptive duplexing ratio defining a total available upstream bandwidth 70 and a total available downstream bandwidth 72, and still further has a required upstream and downstream bandwidth, 74 and 75, respectively, that is needed to support transmission of the FIG. 4, step 90, determined bit rates.

With respect to the DSL system for the new loop communication 86, the group of loop communications 80(1)-80(M) and 86 have a NEXT noise overlapping bandwidth 88 extending in the frequency band from $f_L$ to $f_H$. The frequency $f_L$ at the low end of the NEXT noise overlapping bandwidth 88 is the lowest frequency for any of the downstream bandwidths 72 or 84 in same cable bundle. The frequency $f_H$ at the high end of the NEXT noise overlapping bandwidth 88 is the highest frequency for any of the upstream bandwidths 70 or 82 in same cable bundle. Noting again that the total available upstream and downstream bandwidths 70 and 72 are wider than their corresponding required upstream and downstream bandwidths 74 and 75, there exist several (if not many) possible locations where the required upstream and downstream bandwidths can be placed within the total available upstream and downstream bandwidths. It is further recognized that the NEXT noise contributed to the cable bundle by the addition of the new loop communication 86 and its required upstream and downstream bandwidths 74 and 75 varies as a function of position within the total available upstream and downstream bandwidths 70 and 72. Theoretically speaking, a best location for the required bandwidths 74 and 75 would be completely outside the NEXT noise overlapping bandwidth 88 (for example, in the regions designated at reference 116). In many situations, however, due to the relative sizes of the required upstream and downstream bandwidths 74 and 75 with respect to the total available upstream and downstream bandwidths 70 and 72, as well as the sizes and positions of the bandwidths 82 and 84, this may not be achievable. However, by sliding the position of the required upstream and downstream bandwidths 74 and 75 within the total available upstream and downstream bandwidths 70 and 72, and through the NEXT noise overlapping bandwidth 88, as indicated by the arrows 76, and further noting the NEXT noise contributed to the cable bundle at each possible location, an optimal position having minimized NEXT noise may be selected for the required upstream and downstream bandwidths 74 and 75.

Turning next to FIG. 9, it is noted that on a given cable bundle, M overlapped loop communications 120(1)-120(M) already exist. These communications 120 are established and are each using a designated upstream bandwidth 122 and a designated downstream bandwidth 124 on their respective individual loops. Notably, these bandwidths may, and likely will be, of different sizes and positions within the frequency band (especially if the other modems possess adaptive duplexing ratio and/or selective bandwidth utilization capabilities). At this point, a new loop communication 126 is to be initiated. This loop communication 126, as discussed above in connection with FIG. 7, has a step 91 chosen adaptive duplexing ratio defining a total available upstream bandwidth 70 and a total available downstream bandwidth 72, and still further has a required upstream and downstream bandwidth, 74 and 75, respectively, that is needed to support transmission of the FIG. 4, step 90, determined bit rates.

With respect to the DSL system for the new loop communication 126, the group of loop communications 120(1)-120(M) and 126 have a NEXT noise overlapping bandwidth 128 extending in the frequency band from $f_L$ to $f_H$. The frequency $f_L$ at the low end of the NEXT noise overlapping bandwidth 128 is the lowest frequency for any of the downstream bandwidths 72 or 124 in same cable bundle. The frequency $f_H$ at the high end of the NEXT noise overlapping bandwidth 128 is the highest frequency for any of the upstream bandwidths 70 or 122 in same cable bundle. Noting again that the total available upstream and downstream bandwidths 70 and 72 are wider than their corresponding required upstream and downstream bandwidths 74 and 75, there exist several (if not many) possible locations where the required upstream and downstream bandwidths can be placed within the total available upstream and downstream bandwidths. It is further recognized that the NEXT noise contributed to the cable bundle by the addition of the new loop communication 126 and its required upstream and downstream bandwidths 74 and 75 varies as a function of position within the total available upstream and downstream bandwidths 70 and 72. Theoretically speaking, a best location for the required bandwidths 74 and 75 would be completely outside the NEXT noise overlapping bandwidth 88 (for example, in the region designated at reference 116). In many situations, however, due to the relative sizes of the required upstream and downstream bandwidths 74 and 75 with respect to the total available upstream and downstream bandwidths 70 and 72, as well as the sizes and positions of the bandwidths 122 and 124, this may not be achievable. However, by sliding the position of the required upstream and downstream bandwidths 74 and 75 within the total available upstream and downstream bandwidths 70 and 72, and through the NEXT noise overlapping bandwidth 128, as indicated by the arrows 76, and further noting the NEXT noise contributed to the cable bundle at each possible location, an optimal position having minimized NEXT noise may be selected for the required upstream and downstream bandwidths 74 and 75.

In order to make the position determinations discussed above in connection with FIGS. 8 and 9, and execute the performance of the FIG. 4, step 92, selective bandwidth utilization process, the NEXT noise at each location must be computed as the position of the required upstream bandwidth (for example, reference 74) is slid within the total available upstream bandwidth (for example, 70), and as the position of the required downstream bandwidth (for example, reference 75) is slid within the total available downstream bandwidth (for example, reference 72). The computation of NEXT noise may be accomplished using either of the following two different methods:

First, the Analytical Method. The NEXT noise from n identical disturbing sources can be modeled with empirical coupling transfer functions of the following form:

$$PSD_{NEXT}(f_k) = PSD_{disturber}(f_k) \times X_N \times n^{0.6} \times f^{3/2} \qquad (2)$$

wherein:

$X_N = 8.536 \times 10^{-15}$;

n=number of disturbers;

$f_k$ is the frequency in Hz at k-th subcarrier; and $PSD_{disturber}$ is the power spectrum of the interfering system.

See, T1.417, Spectrum Management for Loop Transmission Systems, American National Standard, Alliance for Telecommunications Industry Solutions (ATIS), January 2001. However, it is very common that different disturbers co-exist in the same cable. To combine the crosstalk contributions from different disturbers, the following expression is used to $$PSD_{\text{NEXT\_TOTAL}}(f_k) = \left( \sum_i^M (PSD_{i,disturber}(f_k, n_i))^{1/0.6} \right)^{0.6} \qquad (3)$$

calculate the NEXT noise due to the combination of sources:

wherein:

M is the number of the types of the disturbers; and $n_i$ is the number of the disturbing sources for each type.

See, T1.417, Spectrum Management for Loop Transmission Systems, American National Standard, Alliance for Telecommunications Industry Solutions (ATIS), January 2001. For example, consider the case of two sources of NEXT at a given receiver. In this case there are $n_1$ disturber systems of spectrum $S_1(f)$ and $n_2$ disturber systems of spectrum $S_2(f)$. The combined NEXT is accordingly expressed as:

$$PSD_{NEXT\_TOTAL}(f_K) = ((S_1(f_k, n_1))^{1/0.6} + (S_2(f_k, n_2))^{1/0.6})^{0.6} \qquad (4)$$

See, T1.417, Spectrum Management for Loop Transmission Systems, American National Standard, Alliance for Telecommunications Industry Solutions (ATIS), January 2001.

Second, the Estimation Method. To compute the NEXT noise, an estimate can be made by evaluating the silent symbols during the initialization process. The corresponding equation for this action is as follows:

$$PSD_{NEXT\_TOTAL}(f_k) = \frac{1}{L\sqrt{2N}} \sum_{i=0}^{L-1} \sum_{n=0}^{2N-1} r_i(n) \exp\left(\frac{j\pi kn}{N}\right) \quad (5)$$

wherein:
L is the total number of the silent DMT symbols for the NEXT noise estimation;
i is the index of the subcarriers for NEXT estimation;
N is the maximum number of subcarriers the IDFT modulator can support; and
the value $r_i(n)$ is the n-th received sample for the i-th DMT symbol.

It is to be noted here that this estimation result in fact is the combination of NEXT, FEXT and additive white Gaussian noise. However, as the NEXT noise is the major source of interference, the above estimation can be approximately regarded as the NEXT noise component.

Figure 10:
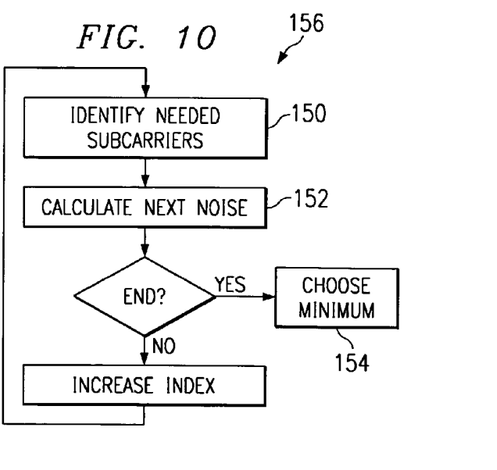
FIG. 10 is a flow diagram for a process to minimize NEXT noise for the new initialized loop in the same cable bundle.

Reference is now made to FIG. 10 wherein there is shown a flow diagram for a process to minimize NEXT noise for the new initialized DSL loop communication in the same cable bundle in connection with making the position determinations discussed above in connection with FIGS. 8 and 9, and the execution of the FIG. 4, step 92, selective bandwidth utilization process. First, in step 150, the number of subcarriers needed to support the upstream data communication and downstream data communication are found when sliding the required bandwidths (for example, references 74 and/or 75) within the total available bandwidths (for example, references 70 and/or 72). This number representing the number of needed subcarriers is likely to be different at different positions (i.e., locations) of the required bandwidths due to the fact that different numbers of bits can be supported in DSL system at different subcarriers. In step 152, the overlapping cost functions are calculated as the required bandwidths, both upstream and downstream, are slid through the corresponding total available bandwidths. The overlapping cost function is defined as:

$$G(i) = \frac{1}{k_1(i) - k_2(i)} \sum_{k=k_1(i)}^{k_2(i)} \frac{4\exp\left(-\frac{3E_s(k)}{4(M-1)\sigma_k^2}\right)}{\sqrt{\frac{3E_s(k)}{2(M-1)\sigma_k^2}} \cdot \sqrt{2\pi}} \quad (6)$$

wherein:
$k_1$ and $k_2$ are the beginning and ending points of the required bandwidth in terms of the subcarrier index, wherein the number of subcarriers between $k_1(i)$ and $k_2(i)$ is fully dependent on the upstream/downstream bitmap for the DMT modulator;
$E_s(k)$ is the symbol energy for the k-th subcarrier during the training process; and
$\sigma_k^2$ is the NEXT noise variance for the k-th subcarrier during the training process;
further wherein:

$$\sigma_k^2 = PSD_{NEXT\_TOTAL}(f_k) \quad (7)$$

as given from Equation (4) or (5). It is to be noted here that $k_1$ and $k_2$ will depend on the position index i for the subcarriers.

The NEXT noise overlapping cost function in Equation (6) is, in fact, the bit error rate of the DSL link to be optimized. By minimizing Equation (6), the DSL link will have optimal performance. To derive Equation (6), the bit error rate of the DSL system has to be determined first. Each of the DMT subcarriers can be viewed as an independent QAM modulated single carrier. Hence, it is appropriate to start with an uncoded QAM system over an ISI-free, Gaussian channel. For M-ary QAM transmissions, the symbol error rate (SER) can be approximated by, $$P_s = N_e \cdot Q\left(\frac{d}{\sigma}\right) \quad (8)$$

$$N_e = \frac{1}{M} \sum_{m=0}^{M-1} N_m \quad (9)$$

wherein:

is the average nearest neighbors;
$N_m$ is the number of the nearest neighbors for the m-th constellation point; and
2d is the minimum distance between adjacent constellation points.

For a QAM system with large constellation size, we can assume all the constellation points have four adjacent signal points around. Notably, this is not valid for the signal points on the edge of the constellation, where they have only 2 or 3 neighbors. However, Equation (8) with $N_e=4$ can be looked on as an upper bound of the symbol error rate (SER). This upper bound is tight for a large constellation where most of the signal points are inner points. For most of the DMT subcarriers, this approximation is accurate as the number of bits carried is fairly large, say, from 6 to 15 bits. As Gray encoding is employed in most of the QAM constellation mapping device, Equation (8) can also be regarded as bound for the BER. The average symbol energy of an M-ary QAM constellation with minimum distance 2d can be expressed as:

$$E_s = \frac{1}{6}(M-1)(2d)^2 \quad (10)$$

Taking Equation (10) into Equation (8), the BER of M-ary QAM can be approximated by:

$$P_b = N_e \cdot Q\left(\sqrt{\frac{3E_s}{2(M-1)\sigma^2}}\right) \quad (11)$$

wherein:

$$Q(x) = \int_x^\infty \frac{1}{\sqrt{2\pi}} e^{-x^2/2} \approx \frac{e^{-x^2/2}}{x\sqrt{2\pi}} \quad (12)$$

$$P_b = N_e \cdot \frac{\exp\left(\frac{-3E_s}{4(M-1)\sigma^2}\right)}{\sqrt{\frac{3E_s}{2(M-1)\sigma^2}} \cdot \sqrt{2\pi}} \quad (15)$$

Equation (11) can be approximated as:

For large constellation size, the number of the neighboring constellation points can be approximately regarded as 4. With this in mind, and averaging the BER over all subcarriers in use, the cost function can be defined as in Equation (6).

Finally, in step 154, minimization of the NEXT noise is made by choosing the position index i having the minimum value of G(i). The corresponding $k_1(i)$ and $k_2(i)$ values represent the starting and ending subcarriers for the required bandwidth (within the total available bandwidth) at the determined position having minimum NEXT noise. By performing this evaluation with respect to both the upstream and downstream bandwidth, the new DSL communication is optimized for NEXT noise in both directions with an adaptively chosen duplexing ratio.

Power consumption is also a very important factor to be managed in DSL systems. This is most commonly an issue raised with respect to the design of the DSL modem, and it applies to both the customer premises equipment (CPE) location and the central office (CO) location. A number of power concerns are recognized in the art. For example, the more power that is transmitted in a DSL system, the more likely it is that crosstalk noise will be coupled to other DSL users in the same cable bundle. It is also recognized that if a universal serial bus (USB) interface is used for an external modem at the CPE side, the power consumption of the modem is limited by the USB standard. With respect to the CO location, many DSL line cards are installed in a very limited space, and heat dissipation is a serious concern. Any reduction in power consumption in the DSL modem is therefore welcomed. Still further, power consumption is also important for laptop computers having limited capacity batteries. Finally, the use of additional bandwidth by the filler material ATM idle cells (which may lead to NEXT noise as discussed above) increases the power consumption for both of the line drivers at the CO and CPE locations without providing a substantive communications benefit.

It should be noted here that NEXT noise minimization process has an added benefit in that the determined $k_1(i)$ and $k_2(i)$ values which represent the starting and ending subcarriers of the required bandwidth at the NEXT noise minimized position within the total available bandwidth further specify, for minimized NEXT noise, a minimum number of subcarriers that are necessary to carry the FIG. 4, step 90, determined required bit rate for the data communication on the new DSL loop. Minimization of the transmission bandwidth with a smaller number of DMT subcarriers leads to a reduction in the power consumption of the line driver. The DMT signal samples in real form after the IDFT modulation can be expressed as:

$$s(n) = \sqrt{\frac{2}{N}} \sum_{k=1}^{N-1} g_k \left\{ a_k \cos\left(\frac{\pi k n}{N}\right) + b_k \sin\left(\frac{\pi k n}{N}\right) \right\} \quad (16)$$

wherein:

$a_k - jb_k$ is the transmitted data for the k-th sub-carrier;

N is the maximum number of subcarriers the IDFT modulator can support;

2N is the fast Fourier transform size of the DMT system; and $g_k$ is the transmission power control factor for the k-th subcarrier.

The average power of the DMT signal can be easily determined as follows:

$$P_s^2 = \frac{1}{N} \sum_{k=1}^{N-1} g_k^2 (a_k^2 + b_k^2) \quad (17)$$

However, if not all of subcarriers are used in the transmitter, the average power of the DMT signal becomes:

$$P_s^2 = \frac{1}{N} \sum_{k_1}^{k_2} g_k^2 (a_k^2 + b_k^2) \quad (18)$$

As the bit rate may vary significantly for different applications and the data rate across the network experiences bottlenecks, the operation disclosed above for choosing an adaptive duplexing ratio and selective bandwidth utilization will have a substantial effect on power consumption reduction. For example, if we assume the downstream bit rate is 500 Kb/s, which typically not available as an Internet accessing speed for most residential users, the power consumption can be reduced by minimizing the number of subcarriers by approximately 91.66% ((6000−500)Kb/6000 Kb). Here, we assume the throughput of the DSL downstream is 6 Mb/s. For a downstream connection with a lower available accessing speed, this figure can still be higher.

Reference is now once again made to FIG. 4. Having determined the size and location of the required bandwidth within the total available bandwidth for the new DSL communication, the process generates of the NEXT minimized DSL signal in step 94.

The maximum number of the available upstream (U) and downstream (D) subcarriers (S) that can be supported by a DSL modem is denoted as $N_{SU}$ and $N_{SD}$, respectively. It is noted that $N_{SU}$ and $N_{SD}$ might be different for various DSL standards. It is also noted that not all the available subcarriers are actually used in connection with the implementation of the present invention. The number of the subcarriers actually used for the upstream and downstream are accordingly denoted as $N_{upstream}$ and $N_{downstream}$. The $N_{upstream}$ and $N_{downstream}$ subcarriers are determined in the manner set forth above (using the process of step 92 and the determination of the position index i having the NEXT noise minimum value of $P_{NEXT}$ along with the corresponding $k_1(i)$ and $k_2(i)$ values representing the starting and ending subcarriers for the required bandwidth). As also discussed above, the determination of the actual number of subcarriers used is dependent on actual data rate to be transmitted by the DSL modem (upstream and downstream) as determined in step 90 and the duplexing ratio selected in step 91.

Figure 1:
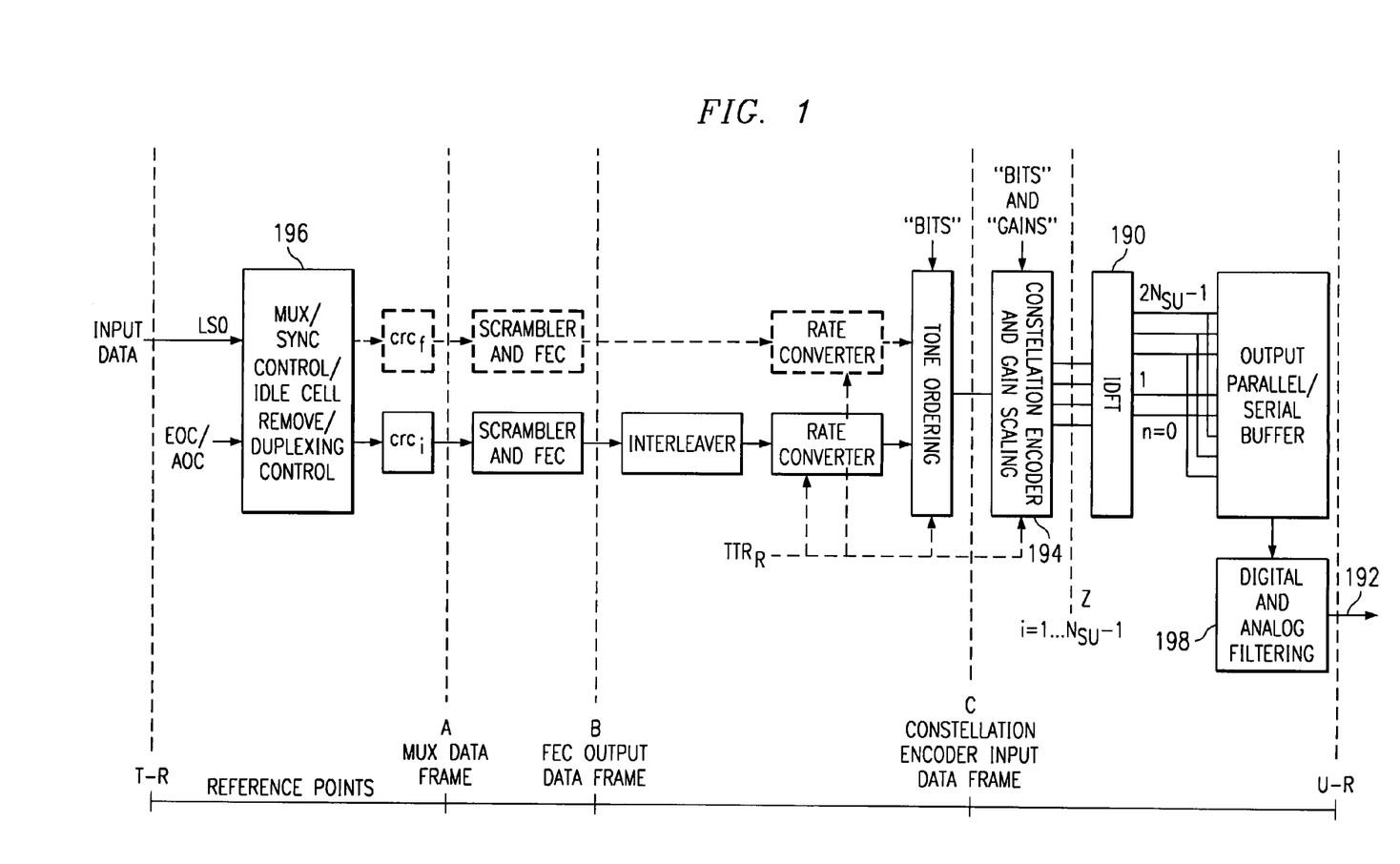
FIG. 1 is a functional block diagram of an ATU-R transmitter for a DSL modem implementing an adaptive duplexing ratio in accordance with the present invention.
Figure 2:
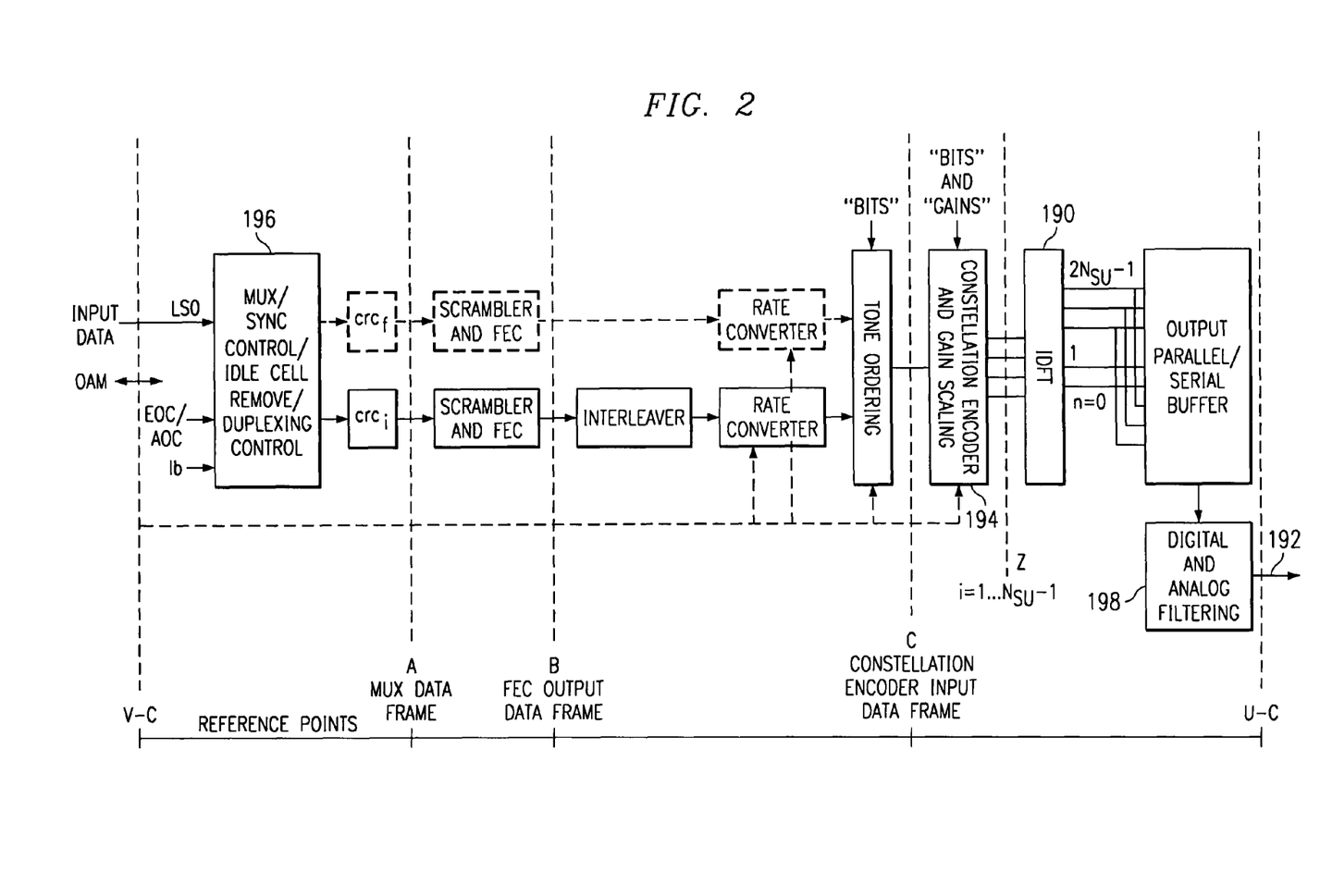
FIG. 2 is a functional block diagram of an ATU-C transmitter for a DSL modem implementing the adaptive duplexing ratio.

Reference is now made to FIGS. 1 and 2 which illustrate functional block diagrams of ATU transmitters for a DSL modem in accordance with the present invention. The ATU-R transmitter is shown in FIG. 1 and the ATU-C transmitter is shown in FIG. 2. The ATU-R transmitter is similar to ATU-C transmitter but without need for and use of an Operation, Administration and Maintenance (OAM) path. The general configuration and operation of such DSL transmitters is well known to those skilled in the art. More detailed discussion of the transmitters is made only to the extent necessary to understand operation of the present invention.

Reference is now made in combination to FIGS. 1, 2 and 4. The generation of the NEXT minimized DSL signal in step 94 is realized through inverse Discrete Fourier Transform (IDFT) modulation (reference 190). For the exemplary table 1 implementation discussed above, the maximum number of subcarriers the IDFT can support is 256, and the size of the IDFT is 512. The reason for this is that current ADSL standards dictate such values. It should also be noted here that the size of the IDFT in FIGS. 1 and 2 is the same in order to fully support duplexing ratio adaptation. The modulating transformation that defines the relationship between the real time domain samples $x_n$ (i.e., the DSL output signals) and the IDFT input $Z_i'$ (to be discussed below) is given by:

$$x_n = \sum_{i=0}^{2N-1} \exp\left(\frac{j\pi n i}{N}\right) Z_i' \quad (19)$$

wherein:

n=0, . . . , 2N−1;

N is a general symbol for the maximum number of the subcarriers supported by the modem ($N_{SU}$<N−2 and $N_{SD}$<N−2, because the size of the IDFT modulator for transmitter and receiver is symmetrical in order to support the functionality for changing the duplexing ratio); and i denotes the subcarrier whose real time domain samples $x_n$ are being calculated.

The result $x_n$ is the signal to be transmitted on the new DSL loop 192. When the steps 90, 91 and 92 are performed by the Mux/Sync Control/Idle Cell Removal/Duplexing Control machine 196 of the transmitter model, the output $x_n$ from the IDFT modulator 190 should generate less NEXT noise to other users in the cable bundle and be power reduced.

For ATU-R (residential or CPE location) and ATU-C (CO location) transmitters, $Z_i'$ is generated using different methods as discussed in more detail below.

For an ATU-R transmitter, assume that $N_{upstream}$ subcarriers ($k_1(i)$, $k_1(i)$+1, . . . , $k_2(i)$, where $k_2(i)=k_1(i)+N_{upstream}-1$) are allocated for the transmission of an upstream signal for a given bit rate. The relationships between $k_1(i)$, $k_2(i)$, $N_{upstream}$, $N_{SU}$ and N are: $k_1(i) \geq 1$, $N_{SU} > k_2(i) > k_1(i)$, $N_{upstream} \leq N_{SU}$, and $N_{SU}$<N−2. It should be noted, for the convenience of this discussion, that it is assumed that the $N_{upstream}$ subcarriers are continuous subcarriers in frequency domain, but this is not a necessity. The complex values from the constellation encoder and gain scaling (reference 194) for the i-th subcarrier is $Z_i$ (i.e., the input data to be transmitted, already packed into symbols). In order to generate the real output $x_n$ from the IDFT modulation as set forth above, $Z_i$ is first mapped to $Z_i'$ using:

$$Z_i' = \begin{cases} 0 & 0 \leq i < k_1(i) \\ Z_i & k_1(i) \leq i \leq k_2(i) \\ 0 & k_2(i) < i \leq N \end{cases} \quad (20)$$

$$Z_i' = conj(Z_{(2N-i)}') \quad (21)$$

The vector $Z_i'$ shall be augmented such that $Z_i'$ has the Hermitian symmetry as follows:

for i=N+1 to 2N−1.

Equation (19) is then used by reference 190 to generate the real output $x_n$ from vector $Z_i'$.

For an ATU-C transmitter, assume $N_{downstream}$ subcarriers ($k_1(i)$, $k_1(i)$+1, . . . , $k_2(i)$, where $k_2(i)=k_1(i)+N_{downstream}-1$) are allocated for the transmission of a downstream signal for a given bit rate. The relationships between $k_1(i)$, $k_2(i)$, $N_{downstream}$, $N_{SU}$, $N_{SD}$ and N for the non-overlapped mode are: $k_1(i) \geq N_{SU}+1$, $N_{SD} > k_2(i) > k_1(i)$, and $N_{downstream} \leq N-N_{SD}-2$. The relationships between $k_1(i)$, $k_2(i)$, $N_{downstream}$, $N_{SU}$, $N_{SD}$ and N for the overlapped mode are: $k_1(i) \geq 1$, $N_{SD} > k_2(i) > k_1(i)$, $N_{downstream} \leq N_{SD}$, and $N_{SD}$<N−2. As we mentioned earlier, the $N_{downstream}$ subcarriers allocated to the downstream need not necessarily be continuous. For both modes, the generation of the DSL downstream signal is identical to the ATU-R, as discussed above, using Equations (20) and 21). The reason for this is that the sizes of the IDFT modulator for ATU-R and ATU-C transmitters are identical in order to be able to support the adaptation of the duplexing ratio. Equation (19) is then used by reference 190 to generate the real output $x_n$ from vector $Z_i'$.

The digital/analog front end 198 of the adaptively duplexed modem utilizes digital and analog filters possessing adaptation abilities in order to accommodate the required bandwidth changes with respect to the upstream and downstream signals in implementing duplexing ratio adaptation of step 91. However, the requirement for a programmable digital/analog front end 198 is not compulsory since the upstream/downstream separation can alternatively be done in the digital domain. In this case an echo canceler is needed to remove the in-band noise. The analog front end in this case should be designed with working range of the full bandwidth. For the hybrid issue, it may be solved by using one hybrid which is designed for a system with a fully overlapped upstream/downstream bandwidth over the whole DSL bandwidth. As the upstream and downstream signals from different chosen duplexing ratios may be regarded as subsets of the fully overlapped system, the hybrid should work well when changes are made in the duplexing ratio to meet user application needs.

When programmable digital filters are employed, the filter coefficients for each duplexing ratio scheme have to be computed offline. If the implementation of the digital front end 198 is made using a digital signal processor, the impact of the change from the adaptation of the upstream and downstream bandwidth is minimal. Different filter coefficients can be directly loaded from the memory.

For hardware implementation of the adaptive digital filters, a set of filter banks can be used. The signal to be transmitted can be switched to the appropriate filter in the filter bank by some programmable switching operations. A similar method can be applied to the analog filters. A filter bank that includes all the possible analog filters can be implemented. By switching between the filters, the signal can be appropriately filtered in accordance with the requirements of the chosen adaptive duplexing ratio.

Due to the adaptation of the duplexing ratio, the upstream and downstream may be overlapped. It may be difficult in this scenario to separate the upstream signals from the downstream signals. In this case, an echo canceler is used in the DSL modem receiver to cancel the interference in the received signal caused by other signals. This echo canceler is designed to work at a maximum overlapping bandwidth between the upstream and the downstream. To comply with the changes from the adaptation of the duplexing ratio, the training DMT symbols for the echo canceler should have the widest bandwidth among all the duplexing options during the initialization process. For example, if the largest bandwidth for upstream signal is Table 1 is 248 subcarriers, the training sequence for this echo canceler for the downstream receiver will have the bandwidth of 248 subcarriers.

It is very common that an adaptively duplexed DSL connection that uses extra bandwidth is initialized first. In this context, "extra" refers to bandwidth that is allocated because it is available, but is not necessarily required. Thereafter, other DSL users initiate communications on the same cable bundle. In this situation, it is not unusual for spectrum usage conflicts to arise with respect to the extra bandwidth due to significant NEXT noise production.

To avoid this situation, the NEXT crosstalk noise from other users in the extra bandwidth region is monitored continuously by the modem that was originally allocated use of the extra bandwidth. When substantial changes in the NEXT noise are experienced, the extra bandwidth has to be given up. The NEXT noise for the k-th subcarrier can be estimated as:

$$\sigma_k^2 = \frac{1}{L}\sum_{i=0}^{L-1}|D_k' - D_k|^2 \qquad (22)$$

wherein:
L is the number of the DMT symbols used for NEXT estimation; and
$D_k'$ and $D_k$ are the demodulated output and correct decision for the k-th subcarrier.

The foregoing Equation (22) can be used to estimate the power of the NEXT noise in the recovered data. When the NEXT noise as determined by the Equation (22) is substantially increased, the bit error rate performance in that particular subcarrier is degraded. NEXT noise contributes a major impairment for DSL communications, and this noise may be minimized by reducing the overlapping bandwidth between the upstream and downstream signals. To accomplish this goal, the DSL controller (using the operating capabilities of the Mux/Sync Control/Idle Cell Removal/Duplexing Control machine 196) abandons some of the extra bandwidth to improve bit error rate performance. For example, in the event the NEXT noise (as determined using Equation (22)) in one or more subcarriers is determined to be larger than a certain threshold, the problematic subcarriers may be abandoned.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for adapting a digital subscriber line (DSL) communications duplexing scheme to meet user application needs, comprising:
   determining, for a new DSL loop communication, a required upstream bit rate and a required downstream bit rate for the user application;
   dividing the required upstream bit rate by the required downstream bit rate to obtain a desired duplexing ratio for the new DSL communication; and
   adapting a duplexing scheme implemented by a DSL modem in support of the new DSL loop communication to at least approximate the desired duplexing ratio, comprising:
      selecting a band of plural adjacent upstream subcarriers numbering less than a total available band of upstream subcarriers on a DSL loop to handle the determined required upstream bit rate; and
      selecting a band of plural adjacent downstream subcarriers numbering less than a total available band of downstream subcarriers on the DSL loop to handle the determined required downstream bit rate;
      such that a ratio of a number of plural adjacent upstream subcarriers in the upstream band to a number of plural adjacent downstream subcarriers in the downstream band approximates the desired duplexing ratio.

2. The method as in claim 1 wherein adapting the duplexing scheme comprises adjusting filters to alter an upstream and downstream bandwidth used by the modem for the new DSL loop communication to match the selected band of plural adjacent upstream subcarriers and the selected band of plural adjacent downstream subcarriers.

3. The method as in claim 1 wherein the step of determining further comprises the step of removing unnecessary idle ATM cells, and the required upstream/downstream bit rate for the new DSL loop communication is a bit rate needed for the new DSL loop communication without inclusion of unnecessary idle ATM cells.

4. The method as in claim 1 further comprising:
   calculating, for a plurality of subcarrier location positions of the required multi-subcarrier upstream bandwidth for the new DSL loop communication within the corresponding total available upstream bandwidth, a crosstalk noise effect of the new DSL loop communication with respect to other active DSL loops in a same cable bundle; and
   choosing a location position for the required multi-subcarrier upstream bandwidth to carry the new DSL loop communication within the total available upstream bandwidth where the calculated crosstalk noise effect with respect to any other active DSL loops is minimized.

5. The method as in claim 4 wherein the step of calculating further includes the step of sliding the required multi-subcarrier upstream bandwidth of the adapted duplexing scheme across the total available upstream bandwidth at the plurality of subcarrier location positions for which crosstalk noise effect is calculated.

6. The method as in claim 1 further comprising:
   calculating, for a plurality of subcarrier location positions of the required multi-subcarrier downstream bandwidth for the new DSL loop communication within the corresponding total available downstream bandwidth, a crosstalk noise effect of the new DSL loop communication with respect to other active DSL loops in a same cable bundle; and
   choosing a location position for the required multi-subcarrier downstream bandwidth to carry the new DSL loop communication within the total available downstream bandwidth where the calculated crosstalk noise effect with respect to any other active DSL loops is minimized.

7. The method as in claim 6 wherein the step of calculating further includes the step of sliding the required multi-subcarrier downstream bandwidth of the adapted duplexing scheme across the total available downstream bandwidth at the plurality of subcarrier location positions for which crosstalk noise effect is calculated.

8. The method as in claim 1 wherein the DSL modem is selectively configurable to implement any one of a plurality of discrete duplexing schemes, and adapting further comprises selecting a certain one of the discrete duplexing schemes that most closely meets the desired duplexing ratio.

9. The method as in claim 1 further including the step of canceling echoes when upstream and downstream are overlapped in the adapted duplexing scheme.

10. Apparatus for adapting a digital subscriber line (DSL) communications duplexing scheme to meet user application needs, comprising:
   means for determining, for a new DSL loop communication, a required upstream bit rate and a required downstream bit rate for the user application, the required upstream bit rate being divided by the required downstream bit rate to obtain a desired duplexing ratio for the new DSL communication; and
   means for adapting a duplexing scheme implemented by a DSL modem in support of the new DSL loop communication to at least approximate the desired duplexing ratio, said means for adapting operating to:
- select a band of plural adjacent upstream subcarriers numbering less than a total available band of upstream subcarriers on a DSL loop to handle the determined required upstream bit rate; and
- select a band of plural adjacent downstream subcarriers numbering less than a total available band of downstream subcarriers on the DSL loop to handle the determined required downstream bit rate;
- such that a ratio of a number of plural adjacent upstream subcarriers in the upstream band to a number of plural adjacent downstream subcarriers in the downstream band approximates the desired duplexing ratio.

11. The apparatus as in claim 10 wherein the means for adapting the duplexing scheme operates to adjust filters to alter an upstream and downstream bandwidth used by the modem for the new DSL loop communication.

12. The apparatus as in claim 10 wherein the means for determining operates to remove unnecessary idle ATM cells, and the required upstream/downstream bit rate for the new DSL loop communication is a bit rate needed for the new DSL loop communication without inclusion of unnecessary idle ATM cells.

13. The apparatus as in claim 10, further comprising:
- means for calculating, for a plurality of subcarrier location positions of the required multi-subcarrier upstream bandwidth for the new DSL loop communication within the corresponding total available upstream bandwidth, a crosstalk noise effect of the new DSL loop communication with respect to other active DSL loops in a same cable bundle; and
- means for choosing a location position for the required multi-subcarrier upstream bandwidth to carry the new DSL loop communication within the total available upstream bandwidth where the calculated crosstalk noise effect with respect to any other active DSL loops is minimized.

14. The apparatus as in claim 13 wherein the means for calculating operates to slide the required multi-subcarrier upstream bandwidth of the adapted duplexing scheme across the total available upstream bandwidth at the plurality of subcarrier location positions for which crosstalk noise effect is calculated.

15. The apparatus as in claim 10 further comprising:
- means for calculating, for a plurality of subcarrier location positions of the required multi-subcarrier downstream bandwidth for the new DSL loop communication within the corresponding total available downstream bandwidth, a crosstalk noise effect of the new DSL loop communication with respect to other active DSL loops in a same cable bundle; and
- means for choosing a location position for the required multi-subcarrier downstream bandwidth to carry the new DSL loop communication within the total available downstream bandwidth where the calculated crosstalk noise effect with respect to any other active DSL loops is minimized.

16. The apparatus as in claim 15 wherein the means for calculating operates to slide the required multi-subcarrier downstream bandwidth of the adapted duplexing scheme across the total available downstream bandwidth at the plurality of subcarrier location positions for which crosstalk noise effect is calculated.

17. The apparatus as in claim 10 wherein the DSL modem is selectively configurable to implement any one of a plurality of discrete duplexing schemes, the means for adapting further operates to select a certain one of the discrete duplexing schemes that most closely meets the desired duplexing ratio.

18. The apparatus as in claim 10 further including an echo canceler operable to cancel echoes when upstream and downstream are overlapped in the adapted duplexing scheme.

19. A digital subscriber line (DSL) transceiver connected to a certain loop in a cable bundle, comprising:
- an idle cell removal machine that is operable to determine for a new DSL loop communication on the certain loop a required upstream bit rate and a required downstream bit rate for a user application, the required upstream bit rate being divided by the required downstream bit rate to obtain a desired duplexing ratio for the new DSL communication;
- a duplexing controller operable to adapt a duplexing scheme implemented in support of the new DSL loop communication to at least approximate the desired duplexing ratio by:
  - selecting a band of plural adjacent upstream subcarriers numbering less than a total available band of upstream subcarriers on a DSL loop to handle the determined required upstream bit rate; and
  - selecting a band of plural adjacent downstream subcarriers numbering less than a total available band of downstream subcarriers on the DSL loop to handle the determined required downstream bit rate;
  - such that a ratio of a number of plural adjacent upstream subcarriers in the upstream band to a number of plural adjacent downstream subcarriers in the downstream band approximates the desired duplexing ratio.

20. The transceiver as in claim 19 wherein the duplexing controller implements any one of a plurality of discrete duplexing schemes, the duplexing controller being further operable to select a certain one of the discrete duplexing schemes that most closely meets the desired duplexing ratio.

21. The transceiver as in claim 19 further including filters that are adjustable to alter an upstream and downstream bandwidth used for the new DSL loop communication.

22. The transceiver as in claim 19 wherein the idle cell removal machine further operates to remove unnecessary idle ATM cells, and the required upstream/downstream bit rate for the new DSL loop communication is a bit rate needed for data communication over the certain loop without inclusion of unnecessary idle ATM cells.

23. The transceiver as in claim 19, further comprising:
- a bandwidth control algorithm for calculating, for a plurality of subcarrier location positions of the required multi-subcarrier upstream bandwidth for the new DSL loop communication within the corresponding total available upstream bandwidth, a crosstalk noise effect of the new DSL loop communication with respect to other active DSL loops in a same cable bundle; and
- a noise minimization algorithm for choosing a location position for the required multi-subcarrier upstream bandwidth to carry the new DSL loop communication within the total available upstream bandwidth where the calculated crosstalk noise effect with respect to any other active DSL loops is minimized.

24. The transceiver as in claim 23 wherein the noise minimization algorithm operates to slide the required upstream bandwidth of the adapted duplexing scheme across the total available multi-subcarrier upstream bandwidth at the plurality of location positions for which crosstalk noise effect is calculated.

25. The transceiver as in claim 19, further comprising:
- a bandwidth control algorithm for calculating, for a plurality of subcarrier location positions of the required multi-subcarrier downstream bandwidth for the new DSL loop communication within the corresponding total available downstream bandwidth, a crosstalk noise effect of the new DSL loop communication with respect to other active DSL loops in a same cable bundle; and a noise minimization algorithm for choosing a location position for the required multi-subcarrier downstream bandwidth to carry the new DSL loop communication within the total available downstream bandwidth where the calculated crosstalk noise effect with respect to any other active DSL loops is minimized.

26. The transceiver as in claim 25 wherein the noise minimization algorithm operates to slide the required downstream bandwidth of the adapted duplexing scheme across the total available multi-subcarrier downstream bandwidth at the plurality of location positions for which crosstalk noise effect is calculated.

27. The transceiver as in claim 19 further including an echo canceler operable to cancel echoes when upstream and downstream are overlapped in the adapted duplexing scheme.

28. The transceiver as in claim 27 wherein the echo canceler is designed to operate at a maximum overlapping bandwidth between the upstream and the downstream.

* * * * *